US012651162B2

(12) United States Patent
Fang et al.

(10) Patent No.: US 12,651,162 B2
(45) Date of Patent: Jun. 9, 2026

(54) METHOD FOR TRAINING FEATURE QUANTIZATION MODEL, FEATURE QUANTIZATION METHOD, DATA QUERY METHODS AND ELECTRONIC DEVICES

(71) Applicants: BOE TECHNOLOGY GROUP CO., LTD., Beijing (CN); Peking University, Beijing (CN)

(72) Inventors: Yigeng Fang, Beijing (CN); Yadong Mu, Beijing (CN); Xiaojun Tang, Beijing (CN)

(73) Assignees: BOE TECHNOLOGY GROUP CO., LTD., Beijing (CN); PEKING UNIVERSITY, Beijing (CN)

( * ) Notice: Subject to any disclaimer, the term of this patent is extended or adjusted under 35 U.S.C. 154(b) by 944 days.

(21) Appl. No.: 17/910,651

(22) PCT Filed: Mar. 12, 2021

(86) PCT No.: PCT/CN2021/080461
§ 371 (c)(1),
(2) Date: Sep. 9, 2022

(87) PCT Pub. No.: WO2021/185171
PCT Pub. Date: Sep. 23, 2021

(65) Prior Publication Data
US 2023/0135021 A1 May 4, 2023

(30) Foreign Application Priority Data
Mar. 16, 2020 (CN) .......................... 202010181479.9

(51) Int. Cl.
*G06N 3/08* (2023.01)
(52) U.S. Cl.
CPC ..................................... *G06N 3/08* (2013.01)

(58) Field of Classification Search
CPC ....................................................... G06N 3/08
See application file for complete search history.

(56) References Cited

U.S. PATENT DOCUMENTS

2019/0295566 A1* 9/2019 Moghadamfalahi ... A61B 5/318
2021/0248456 A1* 8/2021 Guo ........................ G06N 3/045

FOREIGN PATENT DOCUMENTS

CN 110399856 A 11/2019

OTHER PUBLICATIONS

Lazebnik, S., & Raginsky, M. (Jul. 2009). Supervised learning of quantizer codebooks by information loss minimization. IEEE transactions on pattern analysis and machine intelligence, 31(7), 1294-1309. (Year: 2009).*

(Continued)

*Primary Examiner* — Michael J Huntley
*Assistant Examiner* — Maggie Thanh Maido
(74) *Attorney, Agent, or Firm* — XSENSUS LLP

(57) ABSTRACT

A method for training a feature quantization model includes: obtaining a plurality of source data domains; obtaining feature information and labeling information of each of the plurality of source data domains; decomposing the feature information of each of the plurality of source data domains, so as to obtain common feature information and domain-specific feature information of the plurality of source data domains, the common feature information being feature information common to the plurality of source data domains; and training a feature quantization model according to the common feature information of all the source data domains, and domain-specific feature information and the labeling information of each of the plurality of source data domains, so as to obtain a common feature quantization model.

16 Claims, 8 Drawing Sheets

(56) References Cited

OTHER PUBLICATIONS

Jiang, Y. G., Dai, Q., Mei, T., Rui, Y., & Chang, S. F. (Aug. 2015). Super fast event recognition in internet videos. IEEE Transactions on Multimedia, 17(8), 1174-1186. (Year: 2015).*

Hanna, O. A., Ezzeldin, Y. H., Sadjadpour, T., Fragouli, C., & Diggavi, S. (Nov. 2019). On Distributed Quantization for Classification. arXiv preprint arXiv:1911.00216. (Year: 2019).*

* cited by examiner

Perform feature quantization on a target data set by using a common feature quantization model to obtain a feature quantization code of the target data set ⟩— 41

80

81

90

91

92

93

METHOD FOR TRAINING FEATURE QUANTIZATION MODEL, FEATURE QUANTIZATION METHOD, DATA QUERY METHODS AND ELECTRONIC DEVICES

CROSS-REFERENCE TO RELATED APPLICATIONS

The application is a national phase entry under 35 USC 371 of International Patent Application No. PCT/CN2021/080461, filed on Mar. 12, 2021, which claims priority to Chinese Patent Application No. 202010181479. 9, filed on Mar. 16, 2020, which are incorporated herein by reference in their entirety.

TECHNICAL FIELD

The embodiments of the present disclosure relate to the field of data processing technologies, and in particular, to a method for training a feature quantization model, a feature quantization method, and data query methods and electronic devices.

BACKGROUND

Feature quantization is an important technology in artificial intelligence related fields such as computer vision and data mining. The goal of feature quantization is to output simplified feature codes (feature quantization codes) containing concentrated original information (features of original images, videos, texts and other data), and to maintain the expressive ability of the original features to the greatest extent at the same time.

SUMMARY

In a first aspect, embodiments of the present disclosure provide a method for training a feature quantization model, which includes:

obtaining a plurality of source data domains;

obtaining feature information and labeling information of each of the plurality of source data domains;

decomposing the feature information of each of the plurality of source data domains, so as to obtain common feature information and domain-specific feature information of the plurality of source data domains, the common feature information being feature information common to the plurality of source data domains; and training a feature quantization model according to the common feature information of all the source data domains, and domain-specific feature information and the labeling information of each of the plurality of source data domains, so as to obtain a common feature quantization model.

Optionally, training the feature quantization model according to the common feature information of all the source data domains, and the domain-specific feature information and the labeling information of each of the plurality of source data domains, so as to obtain the common feature quantization model includes:

training the feature quantization model according to the common feature information of all the source data domains, and the domain-specific feature information and the labeling information of each of the plurality of source data domains, so as to obtain the common feature quantization model and a domain-specific feature quantization model of each the source data domain.

Optionally, a deep neural network algorithm is used to train the common feature quantization model and the domain-specific feature quantization model.

Optionally, training the feature quantization model includes:

adjusting the feature quantization model so that for a k-th source data domain, $Ex(L(F_0(x),y))$ takes a minimum value.

x represents feature information of the k-th source data domain, y represents labeling information of the k-th source data domain, $F_0$ represents the common feature quantization model, $F_0(x)$ represents a feature quantization code obtained after feature information x is processed by $F_0$, $L(F_0(x),y)$ represents a loss function between the feature quantization code $F_0(x)$ and labeling information y, $Ex(L(F_0(x),y))$ represents a mathematical expectation of the loss function $L(F_0(x),y)$ of the feature information x, k takes a value in a range of from 1 to K (k=1, 2, . . . , K), and K is a number of the plurality of source data domains.

Optionally, training the feature quantization model further includes:

adjusting the feature quantization model so that for the k-th source data domain, $Ex(L(\phi(F_0(x), F_k(x)), y))$ takes a minimum value.

x represents the feature information of the k-th source data domain, y represents the labeling information of the k-th source data domain, $F_0$ represents the common feature quantization model, $F_0(x)$ represents the feature quantization code obtained after the feature information x is processed by $F_0$, $F_k$ represents a domain-specific feature quantization model of the k-th source data domain, $F_k(x)$ represents a feature quantization code obtained after the feature information x is processed by $F_k$, $\phi(F_0(x), F_k(x))$ represents a fusion of $F_0(x)$ and $F_k(x)$, $L(\phi(F_0(x), F_k(x)), y)$ represents a loss function between a fused feature quantization code obtained by $\phi(F_0(x), F_k(x))$ and the labeling information y, $Ex(L(\phi(F_0(x), F_k(x)), y))$ represents a mathematical expectation function of $L(\phi(F_0(x), F_k(x)), y)$, k takes a value in a range of from 1 to K, and K is the number of the plurality of source data domains.

Optionally, training the feature quantization model further includes:

adjusting the feature quantization model so that for the k-th source data domain, $Ex(L(\phi(F_0(x), F_k(x)), y))$ takes a minimum value, and for the k-th source data domain and a p-th source data domain, $Ex(L(\phi(F_0(x), F_k(x)), y))$ is less than $Ex(L(\phi(F_0(x), F_p(x)), y))$ ($Ex(L(\phi(F_0(x), F_k(x)), y)) < Ex(L(\phi(F_0(x), F_p(x)), y))$), p being not equal to k.

x represents the feature information of the k-th source data domain, y represents the labeling information of the k-th source data domain, $F_0$ represents the common feature quantization model, $F_0(x)$ represents the feature quantization code obtained after the feature information x is processed by $F_0$, $F_k$ represents a domain-specific feature quantization model of the k-th source data domain, $F_k(x)$ represents a feature quantization code obtained after the feature information x is processed by $F_k$, $F_p$ represents a domain-specific feature quantization model of the p-th source data domain, $F_p(x)$ represents a feature quantization code obtained after the feature information x is processed by $F_p$, $\phi(F_0(x), F_p(x))$ represents a fusion of $F_0(x)$ and $F_p(x)$, $\phi(F_0(x), F_k(x))$ represents a fusion of $F_0(x)$ and $F_k(x)$, $L(\phi(F_0(x), F_k(x)), y)$ represents a loss function between a fused feature quantization code obtained by $\phi(F_0(x), F_k(x))$ and the labeling information y, $L(\phi(F_0(x), F_p(x)), y)$ represents a loss function between a fused feature quantization code obtained by $\phi(F_0(x), F_p(x))$ and the labeling information y, $Ex(L(\phi(F_0(x), F_p(x)), y))$ represents a mathematical expectation function of $L(\phi(F_0(x), F_p(x)), y)$, k takes a value in a range of from 1 to K, p takes a value in a range of from 1 to K (p=1, 2, . . . , K), and K is the number of the plurality of source data domains.

Optionally, the fusion is performed by using an addition or a linear splicing.

In a second aspect, embodiments of the present disclosure provide a feature quantization method, which includes:

performing feature quantization on a target data set by using a common feature quantization model to obtain a feature quantization code of the target data set, the common feature quantization model being obtained by using the method of training the feature quantization model as described in the first aspect.

In a third aspect, embodiments of the present disclosure provide a data query method applied to a server, which includes:

receiving a target feature quantization code of target query data sent by a client;

comparing the target feature quantization code with a feature quantization code of a target data set to obtain a query result matching the target feature quantization code, the feature quantization code of the target data set being obtained by using the feature quantization method as described in the second aspect; and returning the query result to the client.

Optionally, the feature quantization code of the target data set is obtained by using the common feature quantization model to perform feature quantization on the target data set and stored in advance.

In a fourth aspect, embodiments of the present disclosure provide a data query method applied to a client, and the data query method includes:

obtaining input target query data;

performing feature quantization on the target query data by using a common feature quantization model to obtain a target feature quantization code of the target query data, the common feature quantization model being obtained by using the method for training the feature quantization model as described in the first aspect;

sending the target feature quantization code to a server; and receiving a query result returned, according to the target feature quantization code, by the server.

In a fifth aspect, embodiments of the present disclosure provide an electronic device including a processor, a memory, and a computer program stored on the memory and executable on the processor. The computer program is executed by the processor to implement steps of the method for training the feature quantization model as described in the first aspect.

In a sixth aspect, embodiments of the present disclosure provide an electronic device including a processor, a memory, and a computer program stored on the memory and executable on the processor. The computer program is executed by the processor to implement steps of the feature quantization method in the second aspect.

In a seventh aspect, embodiments of the present disclosure provide an electronic device including a processor, a memory, and a computer program stored on the memory and executable on the processor. The computer program is executed by the processor to implement steps of the data query method as described in the third aspect.

In an eighth aspect, embodiments of the present disclosure provide an electronic device including a processor, a memory, and a computer program stored on the memory and executable on the processor. The computer program is executed by the processor to implement steps of the data query method as described in the fourth aspect.

In a ninth aspect, embodiments of the present disclosure provide a computer-readable storage medium storing a computer program thereon. The computer program is executed by the processor to implement steps of the method for training the feature quantization model as described in the first aspect; or, the computer program is executed by the processor to implement steps of the feature quantization method as described in the second aspect; or, the computer program is executed by the processor to implement steps of the data query method as described in the third aspect; or, the computer program is executed by the processor to implement steps of the data query method as described in the fourth aspect.

BRIEF DESCRIPTION OF THE DRAWINGS

Various other advantages and benefits will become apparent to those of ordinary skill in the art upon reading the following detailed description of alternative embodiments. The drawings are only for purposes of illustrating alternative embodiments and are not to be construed as limiting the present disclosure. In addition, the same components are denoted by the same reference signs throughout the drawings. In the drawings.

DETAILED DESCRIPTION

The technical solutions in the embodiments of the present disclosure will be described clearly and completely with reference to the accompanying drawings in the embodiments of the present disclosure. Obviously, the described embodiments are some but not all of embodiments of the present disclosure. All other embodiments obtained based on the embodiments of the present disclosure by a person of ordinary skill in the art without paying any creative effort shall be included in the protection scope of the present disclosure.

The significance of the feature quantization is that for large-scale data sets (such as massive image data in an image search system), specific tasks (such as image search) can be completed with less storage and computational complexity by using quantized and simplified feature codes. For example, in the field of image searching, the mainstream image feature dimension is usually tens of thousands of dimensions, and representative visual features are, for example, vector of locally aggregated descriptors (VLAD), Fisher Vector or feature vectors of deep network after global average pooling. When performing operations such as image searching, high-dimensional features require extremely high storage costs and computational complexity. Feature quantization can greatly reduce the demand for storage space and the computational complexity at runtime under a condition of basically not losing accuracy. In particular, for millions of image data sets, after feature quantization, the features of the entire data set are usually only a few gigabytes (GB), which may be easily read into a memory of a single server, thus avoiding the input-output (I/O) cost between multi-machine communication and internal memory-external memory in time-consuming cloud services.

Feature quantization algorithms in the related art include K-means clustering, etc. These algorithms are usually unsupervised, and the distance or similarity calculation between features is often based on a standard Euclidean distance or a cosine similarity. In recent years, feature quantization algorithms based on labeling information have gradually gained more attention, and show more powerful performance in practical applications. Common forms of labeling information include semantic labels (for example, one or more labels are given to the semantic categories of images), similarity labels (e.g., specifying whether two images are similar, or even specific similarity values), and the like. However, a common problem when using feature quantization algorithms in a specific target data domain is the lack of labeling information. On the one hand, the acquisition of labeling information often requires manual labeling, which is expensive; on the other hand, labeling information applied in some vertical fields is sparse in nature, such as fine-grained recognition. Therefore, it is difficult to guarantee the performance of the feature quantization algorithm.

Figure 1:
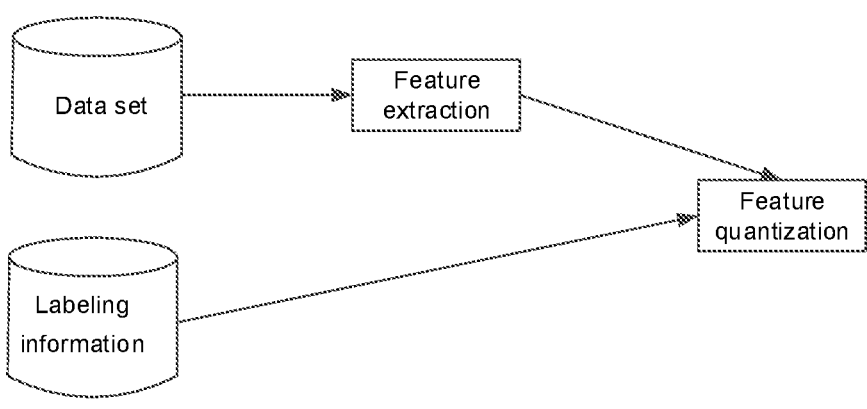
FIG. 1 is a schematic diagram of a feature quantization method in the related art.

Please refer to FIG. 1, which is a schematic diagram of a feature quantization method in the related art. As can be seen from FIG. 1, in the related art, feature information of a data set (or referred to as a data domain) needs to be extracted (i.e., feature extraction) first, and then key parameters of a feature quantization model are optimized based on labeling information of the data set, and finally the obtained feature quantization model is used to perform feature quantization on the extracted feature information. It can be seen that when the labeling information is scarce, the performance of the feature quantization model cannot be guaranteed, so that a more accurate feature quantization code cannot be provided for the data set.

Figure 2:
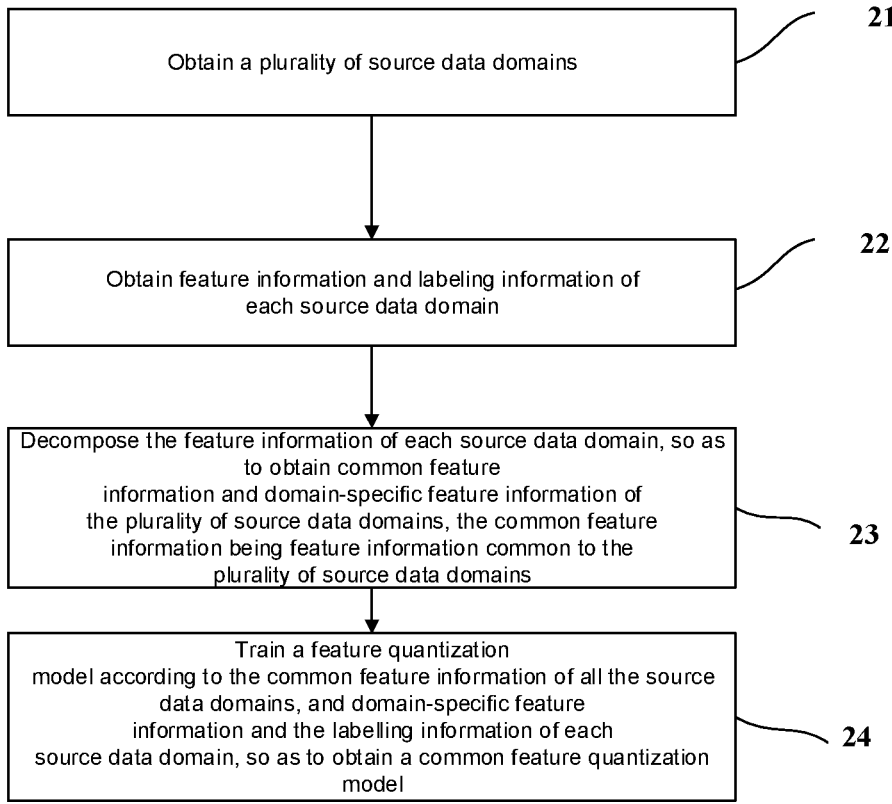
FIG. 2 is a schematic flow diagram of a method for training a feature quantization model, in accordance with embodiments of the present disclosure.

In order to solve the above problem, referring to FIG. 2, embodiments of the present disclosure provide a method for training a feature quantization model, and the to method includes steps 21 to 24.

In step 21, a plurality of source data domains are obtained.

In the embodiments of the present disclosure, a data domain (e.g., a source data domain) may be referred to as a data set, and a single data domain includes a plurality of groups of data. For example, the data domain is an image database including a plurality of images.

The plurality of source data domains have a certain degree of relevance. For example, there are a plurality of identical semantic category labels.

In step 22, feature information and labeling information of each source data domain are obtained.

The feature information may be set according to needs. For example, in the image data set, the feature information may include an image visual information descriptor.

In step 23, the feature information of each source data domain is decomposed, so as to obtain common feature information and domain-specific feature information of the plurality of source data domains, the common feature information being feature information common to the plurality of source data domains.

In some embodiments, the feature information of each source data domain may be decomposed based on a machine learning model such as a convolutional neural network, a Gaussian process, or a linear model.

In step 24, a feature quantization model is trained according to the common feature information of all the source data domains, and domain-specific feature information and the labeling information of each source data domain, so as to obtain a common feature quantization model.

The common feature information is cross-domain invariant common information, and includes knowledge of a plurality of data domains. For example, for data sets of monitoring videos, positions and parameter settings of monitoring cameras are different, so that human faces or poses of human bodies photographed by the monitoring cameras are correspondingly different. In some embodiments, data acquired by each monitoring camera corresponds to a domain. However, images acquired by the monitoring cameras have some commonalities, such as a topology of the human face. That is, the topology of the human face is the common feature information.

In some embodiments, the sequence of performing steps 23 and 24 is not limited. The two steps may be performed simultaneously.

In the embodiments of the present disclosure, a common feature quantization model is obtained by training with abundant labeling information of the plurality of source data domains, and the common feature quantization model may be used for feature quantization of a target data domain (i.e., a target data set) with inadequate labeling information, thereby improving the feature quantization performance of the feature quantization model in the data domain with inadequate labeling information, and providing an accurate feature quantization code for the data domain.

Considering image feature quantization for semantic retrieval tasks as an example, when a specific feature quantization model is applied to a certain target data domain, a method in the related art is to optimize key parameters of the specific feature quantization model based on semantic labeling information of the target data domain. When the semantic labeling information is inadequate, the method in the related art cannot guarantee the feature quantization performance of the specific feature quantization model in the target data domain. In the embodiments of the present disclosure, the plurality of existing relevant source data domains with abundant labeling information are used, the common feature quantization model may be obtained by training with labeling information of the plurality of relevant source data domains, and the feature quantization is performed on the target data domain by using the common feature quantization model, thereby improving the feature quantization performance of the feature quantization model on the target data domain.

Of course, it will be noted that, in the embodiments of the present disclosure, the data domain is not limited to the image data set, and data of the data domain includes but is not limited to image data, video data, or audio data.

In the embodiment of the present disclosure, optionally, training the feature quantization model according to the common feature information of all the source data domains, and the domain-specific feature information and the labeling information of each source data domain, so as to obtain the common feature quantization model includes:

training the feature quantization model according to the common feature information of all the source data domains, and the domain-specific feature information and the labeling information of each source data domain, so as to obtain the common feature quantization model and a domain-specific feature quantization model of each source data domain.

The domain-specific feature information refers to specific feature information for a certain data domain.

Figures 3, 4:
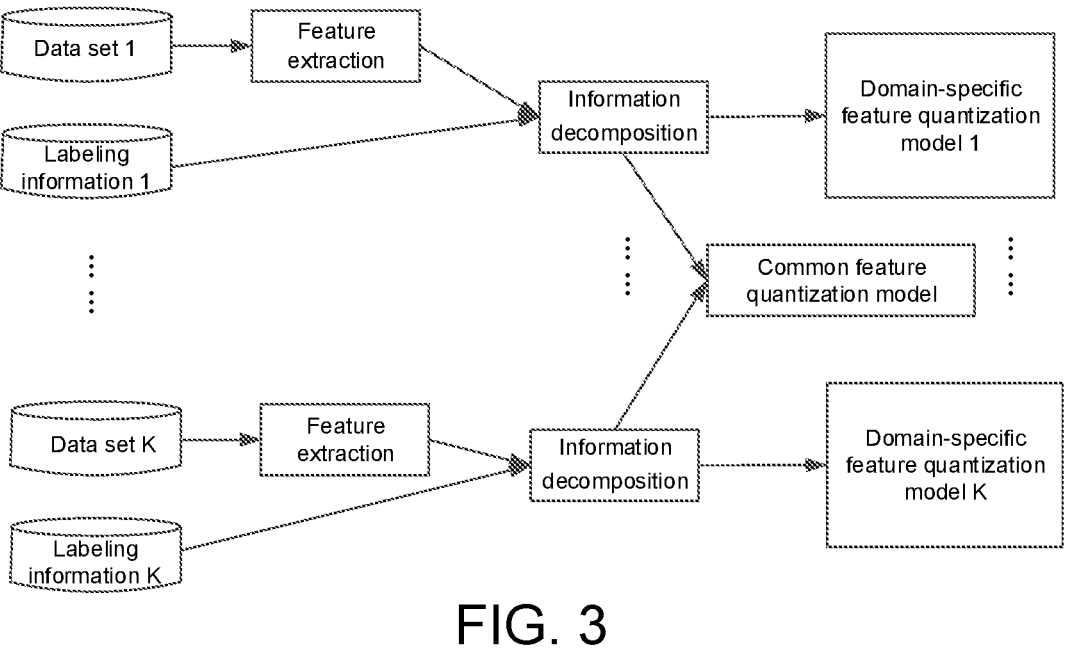
FIG. 3 is a schematic diagram of a method for training a feature quantization model, in accordance with embodiments of the present disclosure.
FIG. 4 is a schematic flow diagram of a feature quantization method, in accordance with embodiments of the present disclosure.

Please refer to FIG. 3, which is a schematic diagram of a method for training a feature quantization model in the embodiments of the present disclosure. As can be seen from FIG. 3, there are K data sets (also called data domains) used to train the feature quantization model. When the feature quantization model is trained, the feature information and the labeling information of each data set need to be obtained, and then the feature quantization model is trained according to the labeling information and the feature information of all data sets. During the training process, the feature information of the data sets may be decomposed into the common feature information and the domain-specific feature information of each data set. Finally, (K+1) models are obtained, which include one common feature quantization model and K domain-specific feature quantization models.

It is assumed that K source data domains (data sets) are set, which are denoted as $\langle x_k, y_k \rangle$. Here, k takes a value in a range of from 1 to K (i.e., k=1, 2, . . . , K); $x_k$ and $y_k$ represent feature information and labeling information (usually in matrix form) of a k-th data set, respectively. For the convenience of discussion, the symbols x and y are used to represent feature information and labeling information of a certain data set, respectively. In the embodiments of the present disclosure, (K+1) models of $F_0$, $F_1$, . . . , $F_K$ are generated through machine learning. For example, a deep neural network algorithm is used to train the feature quantization model to obtain the (K+1) models. $F_0$ is the common feature quantization model shared by all the K data domains, and $F_k$ is a feature quantization model specific to the k-th data domain. $F_k(x)$ represents a feature quantization code obtained after the feature information x is processed by $F_k$. $\phi(F_i(x), F_j(x))$ represents a fusion of $F_i(x)$ and $F_j(x)$ (for example, a simple addition or linear splicing may be performed on $F_i(x)$ and $F_j(x)$). $L(F_k(x), y)$ represents a loss function between the feature quantization code obtained after the feature information x is processed by $F_k$ and the labeling information y (for example, the loss function may be a classification zero-one loss function). It is desired to obtain a smaller loss function value. $Ex(L(F_k(x), y))$ represents a mathematical expectation of the loss function $L(F_k(x), y)$ of x.

In order to obtain the above-mentioned models, a model learning process needs to be performed on all the source data domains $\langle x_k, y_k \rangle$, and a specific optimization target of the learning process includes the following contents.

First, for all situations where k takes a value in a range of from 1 to K (i.e., k=1, 2, . . . , K), $Ex(L(F_0(x), y))$ should take a minimum value.

In this way, it may be ensured that the common feature quantization model obtains excellent feature quantization performance.

Second, for any situation where k takes a value in a range of from 1 to K, $Ex(L(\phi(F_0(x), F_k(x)), y))$ should take the minimum value.

By fusing the common feature quantization model and the domain-specific feature quantization model of the k-th source data domain, the complementarity between the domain-specific feature quantization model and the common feature quantization model may be ensured.

Third, for any situation where k takes a value in a range of from 1 to K, $Ex(L(\phi(F_0(x), F_k(x)), y))$ is less than $Ex(L(\phi(F_0(x), F_p(x)), y))$ (i.e., $Ex(L(\phi(F_0(x), F_k(x)), y)) < Ex(L(\phi(F_0(x), F_p(x)), y)))$, where p is not equal to k, and p takes a value in a range of from 1 to K (i.e., p=1, 2, . . . , K).

Here, x represents the feature information of the k-th source data domain, $F_p(x)$ represents the feature quantization code obtained by processing the domain-specific feature quantization model $F_p$ of the p-th source data domain. $Ex(L(\phi(F_0(x), F_k(x)), y))$ being less than $Ex(L(\phi(F_0(x), F_p(x)), y))$ means that, the loss function between the feature quantization code, obtained after the feature information of the k-th source data domain is processed by using $F_0$ and the domain-specific feature quantization model $F_k$ of the k-th source data domain and then undergoes the fusion, and the labeling information y is less than the loss function between the feature quantization code, obtained after the feature information of the k-th source data domain is processed by using $F_0$ and a domain-specific feature quantization model $F_p$ of any source data domain(e.g., the p-th source data domain) except the k-th source data domain and then undergoes the fusion, and the labeling information y. In other words, the expectation of the loss function between the feature quantization code, obtained after the feature information of the k-th source data domain is processed by using $F_0$ and the domain-specific feature quantization model $F_k$ of the k-th source data domain and then undergoes the fusion, and the labeling information y is the minimum. In this way, it may be ensured that the domain-specific feature quantization model is optimal for a specific data domain.

That is, training the feature quantization model includes:

adjusting the feature quantization model so that for the k-th source data domain (i.e., any source data domain), $Ex(L(F_0(x), y))$ takes a minimum value.

Here, x represents the feature information of the k-th source data domain, y represents the labeling information of the k-th source data domain, $F_0$ represents the common feature quantization model, $F_0(x)$ represents the feature quantization code obtained after the feature information x is processed by $F_0$, $L(F_0(x), y)$ represents the loss function between the feature quantization code obtained after the feature information x is processed by $F_0$ and the labeling information y, and $Ex(L(F_0(x), y))$ represents the mathematical expectation of the L function of the feature information x.

Further, training the feature quantization model further includes:

adjusting the feature quantization model so that for the k-th source data domain, $Ex(L(\phi(F_0(x), F_k(x)), y))$ takes a minimum value.

Here, x represents the feature information of the k-th source data domain, y represents the labeling information of the k-th source data domain, $F_0$ represents the common feature quantization model, $F_0(x)$ represents the feature quantization code obtained after the feature information x is processed by $F_0$, $F_k$ represents the domain-specific feature quantization model of the k-th source data domain, $F_k(x)$ represents the feature quantization code obtained after the feature information x is processed by $F_k$, $\phi(F_0(x), F_k(x))$ represents a fusion of $F_0(x)$ and $F_k(x)$, $L(\phi(F_0(x), F_k(x)), y)$ represents a loss function between a fused feature quantization code obtained by $\phi(F_0(x), F_k(x))$ and the labeling information y, $Ex(L(\phi(F_0(x), F_k(x)), y))$ represents a mathematical expectation function of $(L(\phi(F_0(x), F_k(x)), y)$, k takes a value in a range of from 1 to K (k=1, 2, . . . , K), and K is the number of the source data domains.

Further, training the feature quantization model further includes:

adjusting the feature quantization model so that for the k-th source data domain, $Ex(L(\phi(F_0(x), F_k(x)), y))$ takes the minimum value, and for the k-th source data domain and the p-th source data domain, $Ex(L(\phi(F_0(x), F_k(x)), y))$ is less than $Ex(L(\phi(F_0(x), F_p(x)), y))$ (i.e., $Ex(L(\phi(F_0(x), F_k(x)), y))<Ex(L(\phi(F_0(x), F_p(x)), y)))$, p being not equal to k.

Here, x represents the feature information of the k-th source data domain, y represents the labeling information of the k-th source data domain, $F_0$ represents the common feature quantization model, $F_0(x)$ represents the feature quantization code obtained after the feature information x is processed by $F_0$, $F_k$ represents the domain-specific feature quantization model of the k-th source data domain, $F_k(x)$ represents the feature quantization code obtained after the feature information x is processed by $F_k$, $F_p$ represents the domain-specific feature quantization model of the p-th source data domain, $F_p(x)$ represents the feature quantization code obtained after the feature information x is processed by $F_p$, $\phi(F_0(x), F_k(x))$ represents a fusion of $F_0(x)$ and $F_k(x)$, $\phi(F_0(x), F_p(x))$ represents a fusion of $F_0(x)$ and $F_p(x)$, $L(\phi(F_0(x), F_k(x)), y)$ represents a loss function between a fused feature quantization code obtained by $\phi(F_0(x), F_k(x))$ and the labeling information y, $L(\phi(F_0(x), F_p(x)), y)$ represents a loss function between a fused feature quantization code obtained by $\phi(F_0(x), F_p(x))$ and the labeling information y, $Ex(L(\phi(F_0(x), F_k(x)), y))$ represents a mathematical expectation function of $L(\phi(F_0(x), F_k(x)), y)$, $Ex(L(\phi(F_0(x), F_p(x)), y))$ represents a mathematical expectation function of $L(\phi(F_0(x), F_p(x)), y)$, k takes a value in a range of from 1 to K (i.e., k=1, 2, . . . , K), p takes a value in a range of from 1 to K (i.e., p=1, 2, . . . , K), and K is the number of the source data domains.

In the embodiments of the present disclosure, optionally, the fusion is performed by using an addition or linear splicing method.

In the embodiments of the present disclosure, for any source data domain, compared to a solution of only using the common feature quantization model, the result of the domain-specific feature quantization model and the result of the common feature quantization model are fused, which can improve the feature quantization performance of the data domain.

In the embodiments of the present disclosure, the domain-specific feature quantization models of different data domains may be used interchangeably and fused with the common feature quantization model, and its actual effect is similar to introducing random noise or causing a serious overfitting phenomenon.

After the above-mentioned optimization, the final common feature quantization model is obtained. Subsequently, for any target data set, the common feature quantization model may be used for feature quantization. Here, since each domain-specific feature quantization model is specific to each source data domain, each domain-specific feature quantization model is not used when the feature quantization is performed on the target data set. Each domain-specific feature quantization model and the common feature quantization model may be used to perform the optimization process, so that the final common feature quantization model is obtained.

In the embodiments of the present disclosure, optionally, the feature quantization model is trained by using a deep neural network algorithm. For example, the feature quantization model may be trained based on multi-layer convolution, pooling or a non-linear activation network layer.

In the embodiments of the present disclosure, the feature information of each source data domain may be extracted in various ways. For example, the deep neural network algorithm may be used to extract the feature information of each source data domain. In some embodiments, the feature information of the source data that has been already extracted in the related art may be directly used.

In the embodiments of the present disclosure, optionally, the common feature quantization model and the domain-specific feature quantization model may use a locality sensitive hashing algorithm or a K-means algorithm. Further, optionally, if the data set is an image data set, the common feature quantization model and the domain-specific feature quantization model may use the locality sensitive hashing algorithm.

In the embodiments of the present disclosure, optionally, if the data set is an image data set, for an image retrieval task, the following methods may be adopted: (1) the image feature extraction is based on a pre-trained neural network (e.g., a ResNet-50); (2) the common feature quantization model and the domain-specific feature quantization model adopt a shallow convolution network; (3) the common feature quantization model and the domain-specific feature quantization model are fused through a linear splicing manner.

In the embodiments of the present disclosure, the method for training the feature quantization model may be performed by a server. The feature quantization model obtained after training is sent to a client. Therefore, the client may generate a feature quantization code corresponding to any data set to be feature quantized.

Referring to FIG. 4, the embodiments of the present disclosure further provide a feature quantization method, and the feature quantization method includes step 41.

In step 41, a common feature quantization model is used to perform feature quantization on a target data set to obtain a feature quantization code of the target data set, and the common feature quantization model is obtained by the method for training the feature quantization model.

In the embodiments of the present disclosure, the common feature quantization model is obtained by training with abundant labeling information of a plurality of source data domains, so that the common feature quantization model may be used for feature quantization of a target data domain with inadequate labeling information, which improves the feature quantization performance of the feature quantization model in the data domains with inadequate labeling information.

Figure 5:
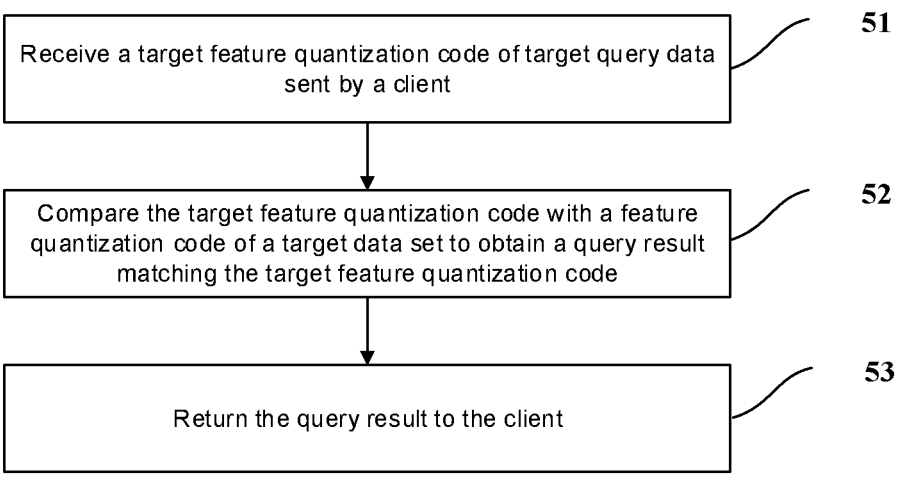
FIG. 5 is a schematic flow diagram of a data query method applied to a server, in accordance with embodiments of the present disclosure.

Referring to FIG. 5, the embodiments of the present disclosure further provides a data query method, and the data query method is applied to a server, and the data query method includes steps 51 to 53.

In step 51, a target feature quantization code of target query data sent by a client is received.

In step 52, the target feature quantization code is compared with a feature quantization code of a target data set to obtain a query result matching the target feature quantization code, and the feature quantization code of the target data set is obtained by using the feature quantization method.

In step 53, the query result is returned to the client.

Optionally, the feature quantization code of the target data set is obtained by using the common feature quantization model to perform feature quantization on the target data set and stored in advance.

Figure 6:
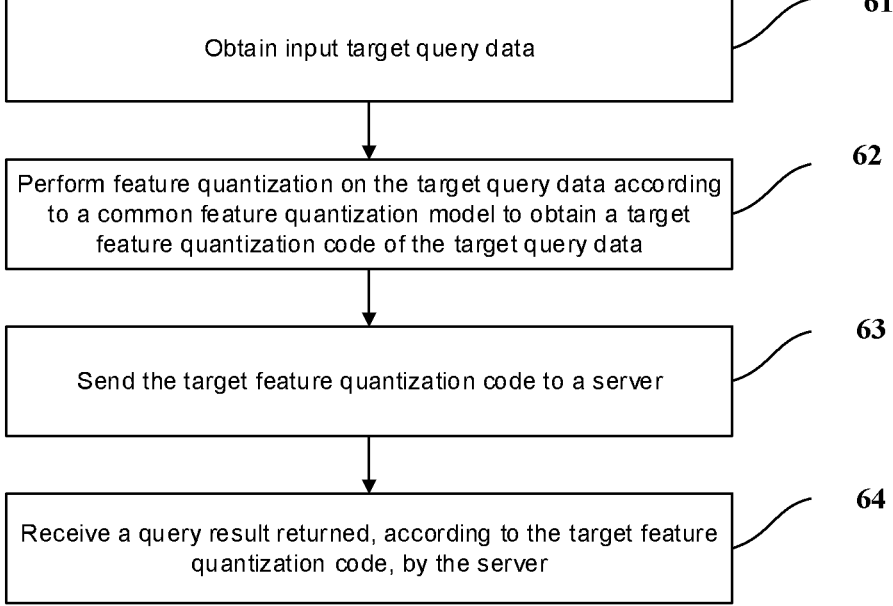
FIG. 6 is a schematic flow diagram of a data query method applied to a client, in accordance with embodiments of the present disclosure.

Referring to FIG. 6, the embodiments of the present disclosure further provide a data query method, the data query method is applied to a client, and the data query method includes steps 61 to 64.

In step 61, input target query data is obtained.

In step 62, feature quantization is performed on the target query data by using a common feature quantization model to obtain a target feature quantization code of the target query data, and the common feature quantization model is obtained by the method for training the feature quantization model.

In step 63, the target feature quantization code is sent to a server.

In step 64, a query result returned by the server for the target feature quantization code is received.

Figure 7:
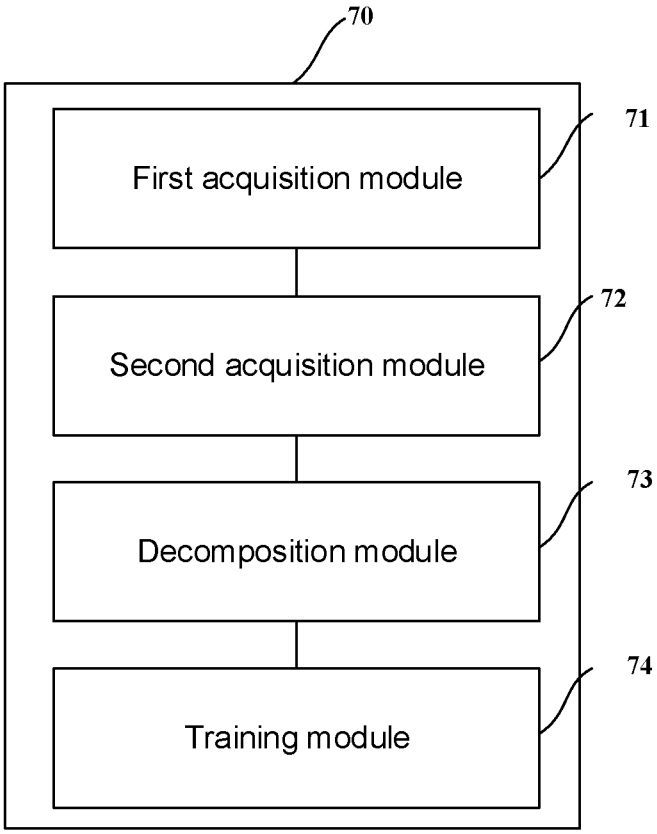
FIG. 7 is a schematic structural diagram of a feature quantization model training device, in accordance with embodiments of the present disclosure.

Referring to FIG. 7, the embodiments of the present disclosure further provide a feature quantization model training device 70, and the feature quantization model training device includes: a first acquisition module 71, a second acquisition module 72, a decomposition module 73, and a training module 74.

The first acquisition module 71 is used to acquire a plurality of source data domains.

The second acquisition module 72 is used to acquire feature information and labeling information of each source data domain.

The decomposition module 73 is used to decompose the feature information of each source data domain, so as to obtain common feature information and domain-specific feature information of the source data domains. The common feature information is feature information common to the plurality of source data domains.

The training module 74 is used to train a feature quantization model according to the common feature information of all the source data domains, and domain-specific feature information and the labeling information of each source data domain, so as to obtain a common feature quantization model.

Optionally, the training module 74 is used to train the feature quantization model according to the common feature information of all the source data domains, and the domain-specific feature information and the labeling information of each source data domain, so as to obtain the common feature quantization model and a domain-specific feature quantization model of each source data domain.

Optionally, the training module 74 is used to use a deep neural network algorithm to train the feature quantization model.

Optionally, the training module 74 is used to adjust the feature quantization model so that for a k-th source data domain, $Ex(L(F_0(x), y))$ takes a minimum value.

Here, x represents feature information of the k-th source data domain, y represents labeling information of the k-th source data domain, $F_0$ represents the common feature quantization model, $F_0(x)$ represents a feature quantization code obtained after the feature information x is processed by $F_0$, $L(F_0(x), y)$ represents a loss function between the feature quantization code $F_0(x)$ and the labeling information y, $Ex(L(F_0(x), y))$ represents a mathematical expectation of the loss function $L(F_0(x), y)$ between the feature information x, k takes a value in a range of from 1 to K (k=1, 2, . . . , K), and K is the number of the source data domains.

Optionally, the training module 74 is further used to adjust the feature quantization model so that for the k-th source data domain, $Ex(L(\phi(F_0(x), F_k(x)), y))$ takes a minimum value.

Here, x represents the feature information of the k-th source data domain, y represents the labeling information of the k-th source data domain, $F_0$ represents the common feature quantization model, $F_0(x)$ represents the feature quantization code obtained after the feature information x is processed by $F_0$, $F_k$ represents a domain-specific feature quantization model of the k-th source data domain, $F_k(x)$ represents the feature quantization code obtained after the feature information x is processed by $F_k$, $\phi(F_0(x), F_k(x))$ represents a fusion of $F_0(x)$ and $F_k(x)$, $L(\phi(F_0(x), F_k(x)), y)$ represents a loss function between a fused feature quantization code obtained by $\phi(F_0(x), F_k(x))$ and the labeling information y, $Ex(L(\phi(F_0(x), F_k(x)), y))$ represents a mathematical expectation function of $L(\phi(F_0(x), F_k(x)), y)$, k takes a value in a range of from 1 to K (k=1, 2, . . . , K), and K is the number of the source data domains.

Optionally, the training module 74 is further used to adjust the feature quantization model so that for the k-th source data domain, $Ex(L(\phi(F_0(x), F_k(x)), y))$ takes a minimum value, and, for the k-th source data domain and a p-th source data domain, $Ex(L(\phi(F_0(x), F_k(x)), y))$ is less than $Ex(L(\phi(F_0(x), F_p(x)), y))$ (i.e., $Ex(L(\phi(F_0(x), F_k(x)), y))<Ex(L(\phi(F_0(x), F_p(x)), y)))$, where p is not equal to k.

Here, x represents the feature information of the k-th source data domain, y represents the labeling information of the k-th source data domain, $F_0$ represents the common feature quantization model, $F_0(x)$ represents the feature quantization code obtained after the feature information x is processed by $F_0$, $F_k$ represents the domain-specific feature quantization model of the k-th source data domain, $F_k(x)$ represents the feature quantization code obtained after the feature information x is processed by $F_k$, $F_p$ represents a domain-specific feature quantization model of the p-th source data domain, $F_p(x)$ represents a feature quantization code obtained after the feature information x is processed by $F_p$, $\phi(F_0(x), F_k(x))$ represents a fusion of $F_0(x)$ and $F_k(x)$, $\phi(F_0(x), F_p(x))$ represents a fusion of $F_0(x)$ and $F_p(x)$, $L(\phi(F_0(x), F_k(x)), y)$ represents a loss function between a fused feature quantization code obtained by $\phi(F_0(x), F_k(x))$ and the labeling information y, $L(\phi(F_0(x), F_p(x)), y)$ represents a loss function between a fused feature quantization code obtained by $\phi(F_0(x), F_p(x))$ and the labeling information y, $Ex(L(\phi(F_0(x), F_k(x)), y))$ represents a mathematical expectation function of $L(\phi(F_0(x), F_k(x)), y)$, $Ex(L(\phi(F_0(x), F_p(x)), y))$ represents a mathematical expectation function of $L(\phi(F_0(x), F_p(x)), y)$, k takes a value in a range of from 1 to K (k=1, 2, . . . , K), p takes a value in a range of from 1 to K (p=1, 2, . . . , K), and K is the number of the source data domains.

Optionally, the training module 74 is used to perform the fusion by using an addition or a linear splicing.

Figure 8:
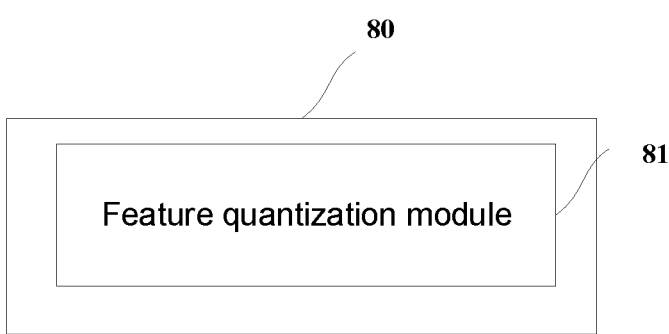
FIG. 8 is a schematic structural diagram of a feature quantization device, in accordance with embodiments of the present disclosure.

Referring to FIG. 8, the embodiments of the present disclosure further provide a feature quantization device 80, which includes a feature quantization module 81.

The feature quantization module 81 is used to perform feature quantization on a target data set by using a common feature quantization model to obtain a feature quantization code of the target data set. The common feature quantization model is obtained by the above-mentioned method of training the feature quantization model.

In some embodiments, the feature quantization device 80 may be a server.

Figure 9:
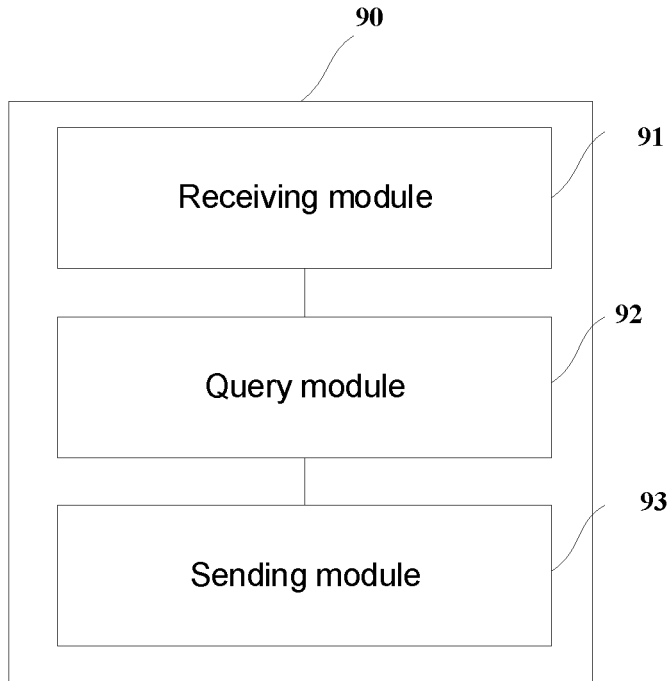
FIG. 9 is a schematic structural diagram of a data query device, in accordance with embodiments of the present disclosure.

Referring to FIG. 9, the embodiments of the present disclosure further provide a data query device 90, which includes a receiving module 91, a query module 92 and a sending module 93.

The receiving module 91 is used to receive a target feature quantization code of target query data sent by a client.

The query module 92 is used to compare the target feature quantization code with a feature quantization code of a target data set, so as to obtain a query result matching the target feature quantization code. The feature quantization code of the target data set is obtained by using the above-mentioned feature quantization method.

The sending module 93 is used to return the query result to the client.

In some embodiments, the data processing apparatus 90 may be a server.

Optionally, the feature quantization code of the target data set is obtained by using the common feature quantization model to perform feature quantization on the target data set and stored in advance.

Figure 10:
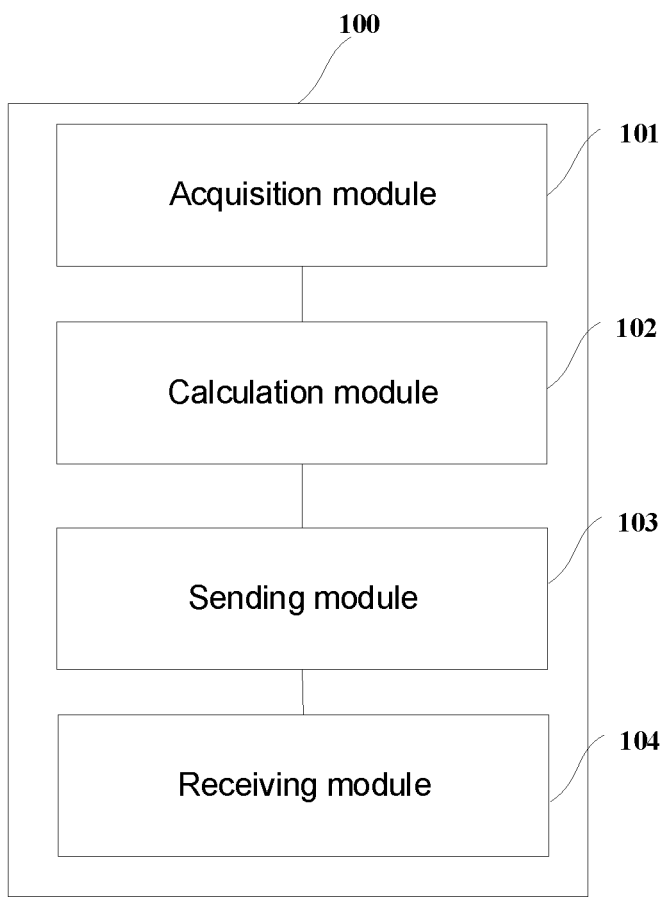
FIG. 10 is a schematic structural diagram of a data query device, in accordance with other embodiments of the present disclosure.

Referring to FIG. 10, the embodiments of the present disclosure further provide a data query device 100, which includes: an acquisition module 101, a calculation module 102, a sending module 103 and a receiving module 104.

The acquisition module 101 is used to acquire input target query data.

The calculation module 102 is used to perform feature quantization on the target query data by using a common feature quantization model to obtain a target feature quantization code of the target query data. The common feature quantization model is obtained by the above-mentioned method for training the feature quantization model.

The sending module 103 is used to send the target feature quantization code to a server.

The receiving module 104 is used to receive a query result returned, according to the target feature quantization code, by the server.

In some embodiments, the data processing apparatus 100 may be a client.

Figure 11:
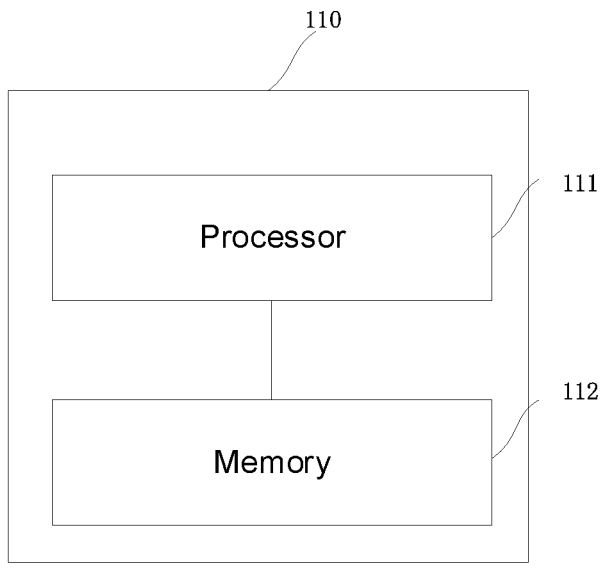
FIG. 11 is a schematic structural diagram of an electronic device, in accordance with embodiments of the present disclosure.

Referring to FIG. 11, the embodiments of the present disclosure further provide an electronic device 110 including a processor 111, a memory 112, and computer programs stored on the memory 112 and executable on the processor 111. The computer programs, when executed by the processor 111, implement steps of the method for training the feature quantization model in the above-mentioned embodiments. The electronic device 110 has the same technical effects as the method for training the feature quantization model, and in order to avoid repetition, details will not be repeated here.

Optionally, the electronic device 110 is a server.

Figure 12:
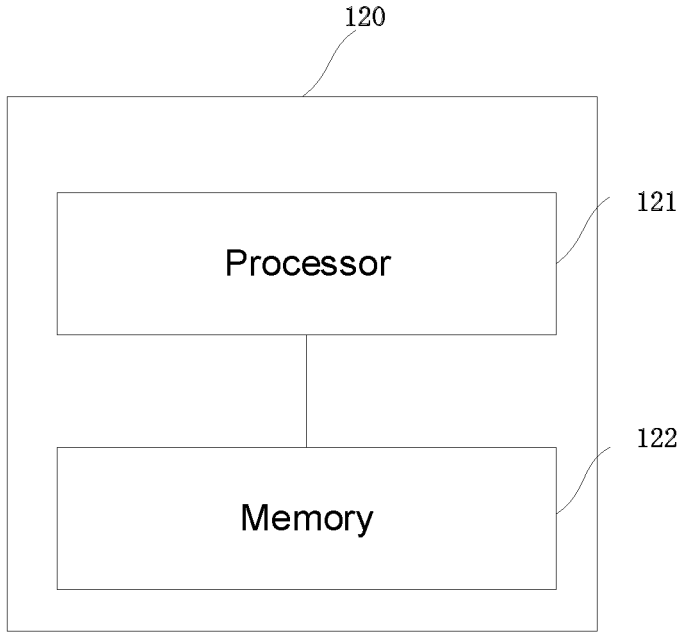
FIG. 12 is a schematic structural diagram of an electronic device, in accordance with other embodiments of the present disclosure.

Referring to FIG. 12, the embodiments of the present disclosure further provide an electronic device 120 including a processor 121, a memory 122, and a computer program stored on the memory 122 and executable on the processor 121. The computer program is executed by the processor 121 to implement steps of the feature quantization method in the above-mentioned embodiments. The electronic device 120 can realize the same technical effects as the feature quantization method, and in order to avoid repetition, details will not be repeated here.

Optionally, the electronic device 120 is a server.

Figure 13:
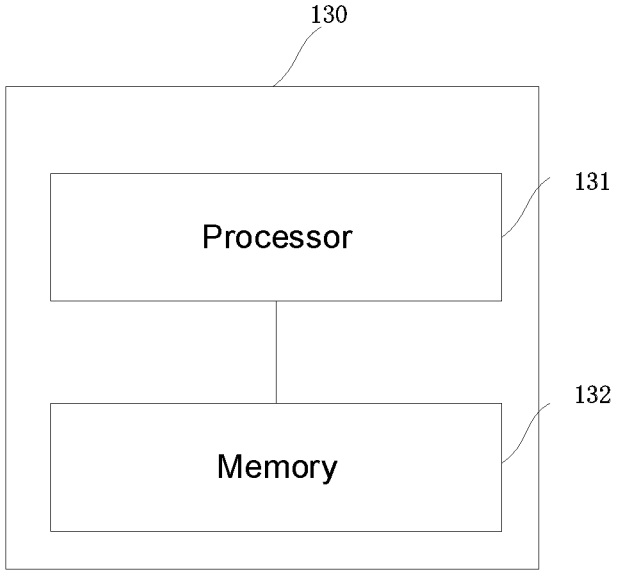
FIG. 13 is a schematic structural diagram of an electronic device, in accordance with still other embodiments of the present disclosure.

Referring to FIG. 13, the embodiments of the present disclosure further provide an electronic device 130 including a processor 131, a memory 132, and a computer program stored on the memory 132 and executable on the processor 131. The computer program is executed by the processor 131 to implement steps of the data query method applied to the server in the above-mentioned embodiments. The electronic device 130 can realize the same technical effects as the data query method applied to the server, and in order to avoid repetition, details will not be repeated here.

Optionally, the electronic device 130 is the server.

Figure 14:
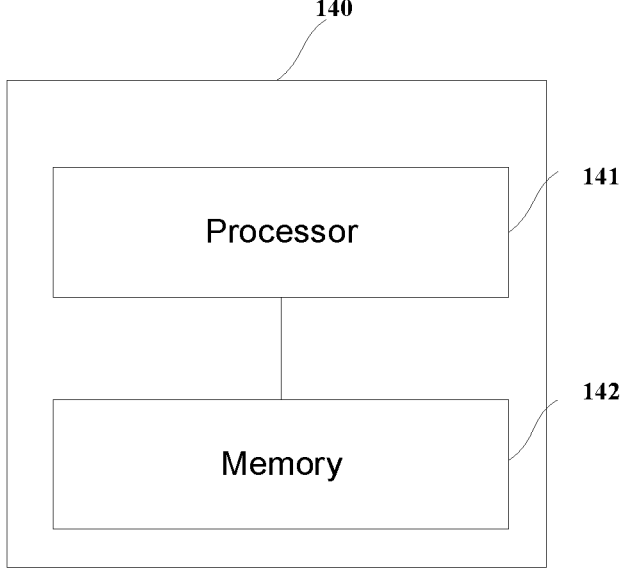
FIG. 14 is a schematic structural diagram of an electronic device, in accordance with still other embodiments of the present disclosure.

Referring to FIG. 14, the embodiments of the present disclosure further provide an electronic device 140 including a processor 141, a memory 142, and a computer program stored on the memory 142 and executable on the processor 141. The computer program is executed by the processor 141 to implement steps of the data query method applied to the client in the above-mentioned embodiments. The electronic device 140 can realize the same technical effects as the data query method applied to the client, and in order to avoid repetition, details will not be repeated here.

Optionally, the electronic device 140 is the client.

The embodiments of the present disclosure further provide a computer-readable storage medium storing a computer program thereon. The computer program is executed by the processor to implement steps of the method for training feature quantization model in the above-mentioned embodiments; or, the computer program is executed by the processor to implement steps of the feature quantization method in the above-mentioned embodiments; or, the computer program is executed by the processor to implement steps of the data query method applied to the server in the above-mentioned embodiments; or, the computer program is executed by the processor to implement steps of the data query method applied to the client in the above-mentioned embodiments. The computer-readable storage medium can realize the same technical effects as any of the above-mentioned methods. In order to avoid repetition, details will not be repeated here.

The computer-readable storage medium is, for example, a read-only memory (ROM), a random-access memory (RAM), a magnetic disk, or an optical disk.

It will be noted that, herein, the terms "comprise", "comprising" or any other variation thereof are intended to encompass non-exclusive inclusion, such that a process, method, article or device comprising a series of elements includes not only those elements, but also other elements not expressly listed, or includes elements inherent to such a process, method, article or device. Without further limitation, an element defined by the phrase "comprising a . . . " does not exclude the presence of other identical elements in a process, method, article or device that include the element.

From the description of the above embodiments, those skilled in the art may clearly understand that the method of the above embodiments can be implemented by means of software and a necessary general hardware platform, and of course, can also be implemented by hardware, but in many cases the former is better implementation. Based on such understanding, the technical solution of the present disclosure, which is essentially or partially contributing to the related art, may be embodied in the form of a software product, and the computer software product is stored in a storage medium (such as ROM/RAM, magnetic disk, optical disk), and comprises a plurality of instructions for causing a terminal (which may be a mobile phone, a computer, a server, an air conditioner, or a network device) to execute the methods according to the embodiments of the present disclosure.

The embodiments of the present disclosure have been described above in conjunction with the accompanying drawings, but the present disclosure is not limited to the above-mentioned specific embodiments, which are merely illustrative rather than restrictive. Under the inspiration of the present disclosure, those skilled in the art can make many forms without departing from the scope of the present disclosure and the protection scope of the claims, all of which fall within the protection of the present disclosure.

What is claimed is:

1. A method for training a feature quantization model, comprising:

obtaining a plurality of source data domains;

obtaining feature information and labeling information of each of the plurality of source data domains;

decomposing the feature information of each of the plurality of source data domains, so as to obtain common feature information and domain-specific feature information of the plurality of source data domains, the common feature information being feature information common to the plurality of source data domains; and training a feature quantization model according to the common feature information of all the source data domains, and domain-specific feature information and the labeling information of each of the plurality of source data domains, so as to obtain a common feature quantization model;

wherein training the feature quantization model includes:

adjusting the feature quantization model so that for a k-th source data domain, $Ex(L(F_0(x), y))$ takes a minimum value, wherein x represents feature information of the k-th source data domain, y represents labeling information of the k-th source data domain, $F_0$ represents the common feature quantization model, $F_0(x)$ represents a feature quantization code obtained after the feature information x is processed by $F_0$, $L(F_0(x), y)$ represents a loss function between the feature quantization code $F_0(x)$ and the labeling information y, $Ex(L(F_0(x), y))$ represents a mathematical expectation of the loss function $L(F_0(x), y)$ of the feature information x, k takes a value in a range of from 1 to K, and K is a number of the plurality of source data domains; and adjusting the feature quantization model so that for the k-th source data domain, $Ex(L(\varphi(F_0(x), F_k(x)), y))$ takes a minimum value, and for the k-th source data domain and a p-th source data domain, $Ex(L(\varphi(F_0(x), F_k(x)), y))$ is less than $Ex(L(\varphi(F_0(x), F_p(x)), y))$, p being not equal to k, wherein x represents the feature information of the k-th source data domain, y represents the labeling information of the k-th source data domain, $F_0$ represents the common feature quantization model, $F_0(x)$ represents the feature quantization code obtained after the feature information x is processed by $F_0$, $F_k$ represents a domain-specific feature quantization model of the k-th source data domain, $F(x)$ represents a feature quantization code obtained after the feature information x is processed by $F_k$, $F_p$ represents a domain-specific feature quantization model of the p-th source data domain, $F_p(x)$ represents a feature quantization code obtained after the feature information x is processed by $F_p$, $\varphi(F_0(x), F_k(x))$ represents a fusion of $F_0(x)$ and $F_k(x)$, $\varphi(F_0(x), F_p(x))$ represents a fusion of $F_0(x)$ and $F_p(x)$, $L(\varphi(F_0(x), F_k(x)), y)$ represents a loss function between a fused feature quantization code obtained by $\varphi(F_0(x), F_k(X))$ and the labeling information y, $L(((F_0(x), F_p(x)), y)$ represents a loss function between a fused feature quantization code obtained by $\varphi(F_0(x), F_p(x))$ and the labeling information y, $Ex(L(\varphi(F_0(x), F_p(x)), y))$ represents a mathematical expectation function of $L(\varphi(F_0(x), F_p(x)), y)$, k takes a value in a range of from 1 to K, p takes a value in a range of from 1 to K, and K is the number of the plurality of source data domains.

2. The method for training the feature quantization model according to claim 1, wherein training the feature quantization model according to the common feature information of all the source data domains, and the domain-specific feature information and the labeling information of each of the plurality of source data domains, so as to obtain the common feature quantization model includes:

training the feature quantization model according to the common feature information of all the source data domains, and the domain-specific feature information and the labeling information of each of the plurality of source data domains, so as to obtain the common feature quantization model and a domain-specific feature quantization model of each of the plurality of source data domains.

3. The method for training the feature quantization model according to claim 2, wherein a deep neural network algorithm is used to train the feature quantization model.

4. The method for training the feature quantization model according to claim 1, wherein the fusion is performed by using an addition or a linear splicing.

5. A feature quantification method, comprising:

performing feature quantization on a target data set by using a common feature quantization model to obtain a feature quantization code of the target data set, the common feature quantization model being obtained by using the method for training the feature quantization model according to claim 1.

6. A data query method applied to a server, comprising:

receiving a target feature quantization code of target query data sent by a client;

comparing the target feature quantization code with a feature quantization code of a target data set to obtain a query result matching the target feature quantization code, wherein the feature quantization code of the target data set is obtained by using the feature quantization method according to claim 5; and returning the query result to the client.

7. The data query method according to claim 6, wherein the feature quantization code of the target data set is obtained by using the common feature quantization model to perform feature quantization on the target data set and stored in advance.

8. An electronic device comprising a processor, a memory, and a computer program stored on the memory and executable on the processor, wherein the computer program is executed by the processor to implement steps of the data query method according to claim 6.

9. A non-transitory computer-readable storage medium storing a computer program thereon, wherein the computer program is executed by the processor to implement steps of the data query method according to claim 6.

10. An electronic device comprising a processor, a memory, and a computer program stored on the memory and executable on the processor, wherein the computer program is executed by the processor to implement steps of the feature quantization method according to claim 5.

11. A non-transitory computer-readable storage medium storing a computer program thereon, wherein the computer program is executed by the processor to implement steps of the feature quantization method according to claim 5.

12. A data query method applied to a client, the method comprising:

obtaining input target query data;

performing feature quantization on the target query data by using a common feature quantization model to obtain a target feature quantization code of the target query data, the common feature quantization model being obtained by using the method for training the feature quantization model according to claim 1;

sending the target feature quantization code to a server; and receiving a query result returned, according to the target feature quantization code, by the server.

13. An electronic device comprising a processor, a memory, and a computer program stored on the memory and executable on the processor, wherein the computer program is executed by the processor to implement steps of the data query method according to claim 12.

14. A non-transitory computer-readable storage medium storing a computer program thereon, wherein the computer program is executed by the processor to implement steps of the data query method according to claim 12.

15. An electronic device comprising a processor, a memory, and a computer program stored on the memory and executable on the processor, wherein the computer program is executed by the processor to implement steps of the method for training the feature quantization model according to claim 1.

16. A non-transitory computer-readable storage medium storing a computer program thereon, wherein the computer program is executed by the processor to implement steps of the method for training the feature quantization model according to claim 1.

* * * * *